2,886,455

PAINT CONTAINING A REACTION PRODUCT OF A HYDROCARBON ISOCYANATE WITH ETHYLENE IMINE

Roger H. Doggett, Natick, and Alfred R. Johnson, Stoneham, Mass., assignors to Arthur D. Little, Inc., Cambridge, Mass., a corporation of Massachusetts No Drawing. Application April 19, 1954
Serial No. 424,245

7 Claims. (Cl. 106—252)

This invention relates to paints, varnishes and similar coatings for cellulosic surfaces such as wood, and in particular to paints and varnishes which are resistant to peeling from such surfaces.

One of the most important causes of premature paint failure is peeling or blistering. While the consumer frequently blames the paint for this type of failure, the fault is usually not that of the paint. Moisture is the usual cause of paint peeling; this moisture may be present in the wood at the time the paint is applied, or it may pass through the wood because of a moisture gradient, particularly during the cold months. This moisture gradient is such that the driving force is from the interior toward the exterior. This latter condition has become more prominent in recent years in buildings using new construction and insulation techniques. A moisture gradient also occurs if moisture is allowed to penetrate behind the film of paint as by contact of wood with the ground or by faulty construction.

It is apparent that the paint-to-wood bond is never particularly strong, and that it is probably only mechanical, i.e. the paint, when applied, flows into the minute crevices and interstices in the surface to which it is applied, and then becomes anchored upon drying.

The principal object of this invention is to provide a coating which bonds to wood surfaces by chemical action, as well as by the mechanical action usual in conventional coatings such as paints, whereby a firm bond is established and peeling is largely or entirely eliminated.

Other objects will be apparent from the following disclosure.

Fundamentally, this invention may be practiced by incorporating with the coating, as at least part of the vehicle, a hydrocarbon monoisocyanate or monoisothiocyanate having at least 12 carbon atoms in the hydrocarbon radical which is compatible with the other ingredients of the coating. This isocyanate or isothiocyanate may constitute only a part of the vehicle, in which case it must be miscible with the drying oil and other components of the vehicle.

Preferably, however, the isocyanate or isothiocyanate is a relatively long-chain unsaturated compound constituting the main portion of the vehicle in place of the linseed and/or other drying oils customarily used.

Even more effective, especially for wood surfaces which are not entirely dry, are the ethylene imine reaction products of the isocyanates and isothiocyanates referred to above.

While the exact nature of the reaction between the isocyanates and isothiocyanates and the wood is not entirely understood, we believe that hydroxyl radicals present in the cellulose of the wood react in some manner such as the following:

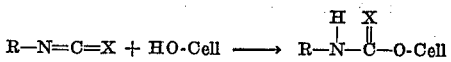

where X is O in the case of isocyanates and S in the case of isothiocyanates; Cell-OH representing cellulose and R representing a hydrocarbon radical, in each instance. It will be noted that no water is split out in this reaction. Evidently some reaction between the cellulose and the —NCO or —NCS radical takes place, to account for the firm water-resistant bond between the wood and the paint which is accomplished by the present invention.

A typical conventional outside white paint used as a finishing coat contains about 63% pigment and 37% vehicle, the latter consisting of linseed or other drying oil, turpentine or other mineral spirits, and drier such as lead naphthenate. The amounts of each vary between different manufacturers and end uses, and also may be adjusted by the painter to meet any particular conditions, as by adding linseed oil and/or turpentine.

When using saturated isocyanates or isothiocyanates in the paints of this invention, they are incorporated as a part of the vehicle in addition to the ordinary constituents thereof, the total vehicle constituting approximately the same percentage of the whole paint as usual.

Depending upon the consistency of the isocyanate used in each instance, the specific amounts of the drying oils and mineral spirits will be varied to suit the requirements as to consistency of the final paint. The amount of isocyanate may replace as much as 100% of the drying oil if an unsaturated drying oil isocyanate is employed and from about 1% to about 20% if the non-drying oil type is used. In any case from 1% to 20% is preferred. When using 10% isocyanate, the following example will serve to illustrate suitable variations of a conventional formula according to the foregoing remarks (parts are by volume):

|  | Conventional | Isocyanate |
|---|---|---|
| Linseed oil | 68 | 63 |
| Mineral Spirits | 27 | 22 |
| Drier | 5 | 5 |
| Isocyanate | 0 | 10 |
| Total | 100 | 100 |

As already pointed out, it is however preferable to use an isocyanate or isothiocyanate of an unsaturated hydrocarbon, and in particular a hydrocarbon which is a drying oil constituent, specifically oleyl, linoleyl, or linolenyl isocyanate or isothiocyanate, or mixtures thereof such as the isocyanate or isothiocyanate of linseed oil. Such compounds may replace some or all of the drying oils customarily used in paints, and when so used they perform both the function of the usual drying oil and also the function of bonding the paint to the wood. The usual driers such as lead or other metal naphthenates are included in the resulting vehicle, as are also turpentine and/or other mineral spirits, in amount sufficient to give the desired consistency. As a rule, the amount of such mineral spirits in the vehicle will be somewhat higher than with the corresponding customary drying oils, since the isocyanates, and more particularly the isothiocyanates, of such oils are thicker upon standing than the corresponding oils themselves. The driers serve their usual function of polymerizing the unsaturated compounds to provide the final hard coat, and they also assist in the reaction between the isocyanates (and isothiocyanates) and the wood.

All the compositions referred to above should be applied to dry wood surfaces. If the wood is wet at the time the paint is applied, the —NCO or —NCS radical reacts preferentially with water, so that the desired bonding to the wood surface will be lessened or may even not take place at all. To overcome the difficulty, the isocyanate or isothiocyanate may be reacted with ethylene imine, $(CH_2)_2NH$, to give compounds of the formula

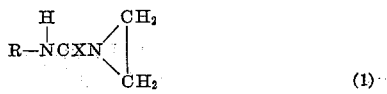 (1)

where X is oxygen or sulfur. The reaction of such compounds with cellulose may be represented by the following equation:

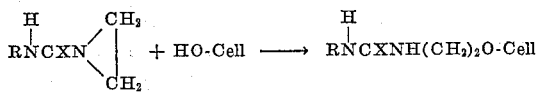

The compounds of ethylene imine with isocyanates and isothiocyanates may be used in place of, and in the same manner as, the isocyanates and isothiocyanates referred to hereinabove. Alternatively, if desired, they may be used alone as primer coatings on wood, in which circumstance they will bond to the wood through the mechanism of the equation just given and will thus also provide hydrocarbon radicals attached to the wood, which radicals are compatible with, and have affinity for, the oleo-resinous constituents of the paint films.

The following examples will serve as illustrative of this invention without, however, being considered as limiting it.

Example I

The linoleic isocyanate-ethylene imine reaction product corresponding to Formula 1 above wherein R is the radical of linoleic acid is used as a priming coat, by spraying it onto the wood surface to be treated and drying the thus-coated wood. This operation may conveniently be carried out in a wood-working plant and the drying done in the usual drying kiln simultaneously with the seasoning of the wood and under the same time and temperature conditions. The resulting coating is tightly adherent to the wood, and strongly resistant to peeling and blistering. This coating may then be painted with conventional paints, or with the paints of this invention, to provide the desired final appearance. These paints are firmly adherent to the initial coating, and likewise are strongly resistant to peeling and blistering.

The linoleic isocyanate-ethylene imine reaction product may if desired be thinned somewhat, as with conventional thinners, but this as a rule is neither necessary nor desirable since the thinners are volatilized during drying and may present an explosion hazard.

A few percent of a conventional drier, such as lead naphthenate, should preferably be mixed with the linoleic isocyanate-ethylene imine reaction product, but the necessity for a drier decreases as the drying period is lengthened and hence in many cases the drier may be entirely omitted.

On the other hand, if the coating of this example is applied by brushing, and dries by exposure to the atmosphere, the drier should be added, in the amount of say 5% by weight on the reaction product, and a thinner such as conventional mineral spirits should be added in an amount to give suitable brushing properties.

Example II

A paint is prepared containing 63 parts pigments and 37 parts vehicle, the vehicle being composed of the following ingredients (all parts being by weight):

| | Parts |
|---|---|
| Linseed oil | 50 |
| Mineral spirits | 25 |
| Linoleic isocyanate | 20 |
| Drier | 5 |
| | 100 |

This paint is sprayed on to the wood as a primer coat and dried, in the same manner as described in Example I for the linoleic isocyanate-ethylene imine reaction product, and it similarly forms a strong bond, to which a final coat or coats of paint may be applied, all of which are strongly resistant to peeling and blistering.

Alternatively, the above-described paint of this Example II may be applied to wood surfaces by brushing, and allowed to dry by exposure to the atmosphere in the usual manner of hand-applied paints.

Example III

A paint is prepared as in Example II but having a vehicle composed as follows (parts by weight):

| | Parts |
|---|---|
| Linseed oil | 63 |
| Mineral spirits | 22 |
| Octadecyl isocyanate | 10 |
| Drier | 5 |
| | 100 |

This paint is applied by conventional brushing technique and is dried by exposure to the atmosphere. Additional coats of the same or conventional paints may then be applied, and all these coats are firmly bonded to the wood and strongly resist peeling and blistering.

Example IV

A paint is prepared as in Examples II and III but having a vehicle composed as follows (parts by weight):

| | Parts |
|---|---|
| Linseed oil | 68 |
| Mineral spirits | 25 |
| Octadecyl isocyanate-ethylene imine reaction product | 2 |
| Drier | 5 |
| | 100 |

This paint is applied and dried as in Example III, and further coats may be similarly applied. Excellent adhesion and resistance to peeling and blistering result.

While the foregoing description has related primarily to outside paints and lacquers, especially of the type of outside white linseed oil base paints, it should be understood that this invention may be advantageously employed in other finishes such as dipping lacquers which are intended for use in locations where water may be present.

We claim:

1. A paint composition consisting essentially of a pigment, a drying oil, mineral spirits, a drier, and an isocyanate, said isocyanate being selected from the group consisting of hydrocarbon monoisocyanates and hydrocarbon monoisothiocyanates the hydrocarbon radical of which contains at least 12 and not more than 18 carbon atoms and reaction products thereof with ethylene imine, said isocyanate constituting between one and 20 percent of the vehicle of said composition.

2. A paint composition according to claim 1 wherein the hydrocarbon radicals of said isocyanates are saturated.

3. A paint composition consisting essentially of a pigment, a drying oil, mineral spirits, a drier, and the reaction product of ethylene imine and an isocyanate of the group consisting of alkyl and alkylene monoisocyanates and monoisothiocyanates the hydrocarbon radical of which contains at least 12 and not more than 18 carbon atoms, said isocyanate constituting between one and 20 percent of the vehicle of said composition.

4. A paint composition according to claim 3 wherein the hydrocarbon radicals of said isocyanates are saturated.

5. A paint composition according to claim 3 wherein the hydrocarbon radicals of said isocyanates are unsaturated.

6. A paint composition according to claim 1 wherein the hydrocarbon radicals of said isocyanates are unsaturated.

7. A paint composition according to claim 1 wherein the hydrocarbon radical is the radical of a drying oil constituent.

References Cited in the file of this patent

UNITED STATES PATENTS

| | | |
|---|---|---|
| 2,222,208 | Ulrich | Nov. 19, 1940 |
| 2,358,475 | Pratt et al. | Sept. 19, 1944 |
| 2,370,405 | Kaase | Feb. 27, 1945 |
| 2,374,136 | Rothrock | Apr. 17, 1945 |
| 2,388,656 | Lichty et al. | Nov. 6, 1945 |
| 2,430,479 | Pratt et al. | Nov. 11, 1947 |
| 2,533,559 | Klein | Dec. 5, 1950 |
| 2,609,349 | Cass | Sept. 2, 1952 |
| 2,677,681 | Gill | May 4, 1954 |
| 2,678,869 | Schnell et al. | May 18, 1954 |

FOREIGN PATENTS

| | | |
|---|---|---|
| 565,777 | Great Britain | Nov. 28, 1944 |